United States Patent [19]

Low

[11] Patent Number: 4,920,799

[45] Date of Patent: May 1, 1990

[54] UNIVERSAL CASING FOR AN INSTRUMENT

[75] Inventor: Douglas W. Low, Essex, Conn.

[73] Assignee: International Marine Industries, Inc., Stamford, Conn.

[21] Appl. No.: 247,894

[22] Filed: Sep. 22, 1988

[51] Int. Cl.⁵ .................. G01D 11/24; G01D 11/26; G01D 11/30; G12B 9/02

[52] U.S. Cl. ........................................ 73/431; 73/493; 248/27.1; 248/904

[58] Field of Search ............... 73/431, 493; 248/27.1, 248/DIG. 4; 220/18; 324/156

[56] References Cited

U.S. PATENT DOCUMENTS

| | | |
|---|---|---|
| 1,806,295 | 5/1931 | Kinnard .............................. 248/27.1 |
| 2,463,844 | 3/1949 | Anderson ............................ 73/431 |
| 2,738,672 | 3/1950 | Smith et al. ....................... 73/431 X |
| 3,594,911 | 7/1971 | Sherman et al. .................. 73/431 X |
| 3,599,910 | 8/1971 | Wipft ................................... 248/27.1 |
| 3,746,931 | 7/1973 | Muronaka ....................... 248/27.1 X |
| 3,751,791 | 8/1973 | Horwitz et al. ................. 248/27.1 X |
| 4,557,445 | 12/1985 | Ohara ................................. 248/27.1 |
| 4,623,110 | 11/1986 | Kanari ................................ 248/27.1 |
| 4,736,924 | 4/1988 | Bednar ........................... 248/27.1 X |
| 4,772,986 | 9/1988 | McNemor ........................ 73/431 X |

FOREIGN PATENT DOCUMENTS

| | | |
|---|---|---|
| 44542 | 1/1982 | European Pat. Off. ............. 73/431 |
| 60736 | 9/1982 | European Pat. Off. ............. 73/431 |
| 2443867 | 3/1976 | Fed. Rep. of Germany ........ 73/431 |
| 1285540 | 1/1987 | U.S.S.R. ............................ 248/27.1 |
| 1438753 | 6/1976 | United Kingdom ................. 73/431 |
| 2117524 | 10/1983 | United Kingdom ................. 73/431 |

OTHER PUBLICATIONS

Technical Bulletin BH183 (Series) by Howell Instruments Inc. of Fort Worth, TX, U.S.A., "3"-Dia. Digital Indicators; published by Jun. 1966; 4 pages.

Primary Examiner—Tom Noland
Attorney, Agent, or Firm—St. Onge Stewart Johnston & Reens

[57] ABSTRACT

The invention presented in a universal-casing for an instrument having a read-out, suitable for flush, surface or bracket mounting. The casing comprises a watertight instrument module which comprises (i) a facepiece having at least one aperture through which the read-out of the instrument can be observed, and (ii) an instrument housing extending rearwardly from the facepiece and mounted to the facepiece in a watertight fashion, the housing comprising a hollow body having an open front end mounted to the facepiece and a closed rear end; and a splash-resistant surface mount having removably mounted to the facepiece, the surface mount housing having the hollow body of the instrument housing disposed therein.

16 Claims, 4 Drawing Sheets

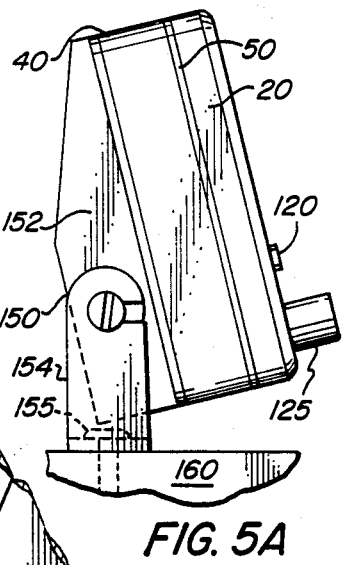
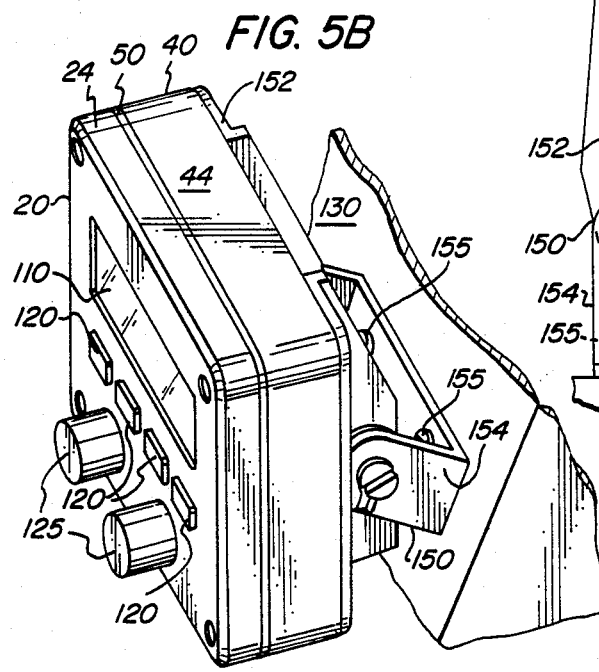
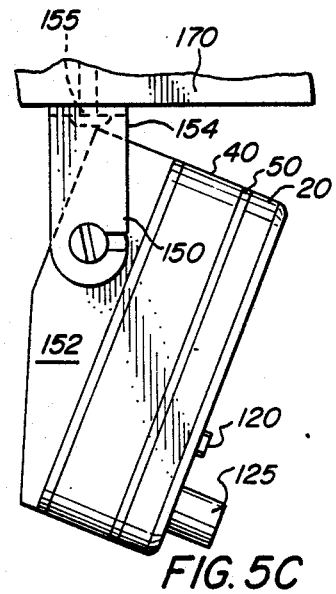
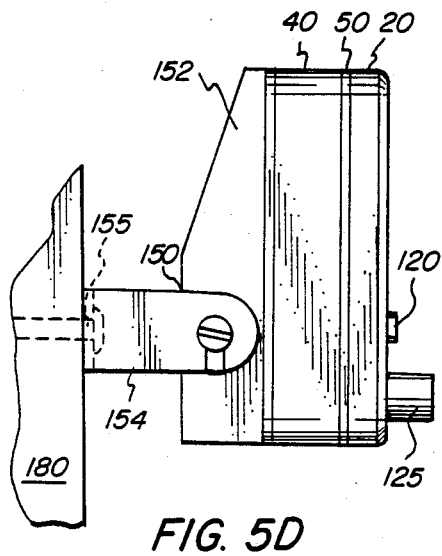
FIG. 5A
FIG. 5B
FIG. 5C
FIG. 5D

UNIVERSAL CASING FOR AN INSTRUMENT

Technical Field

The present invention relates to a universal casing for an instrument, especially a marine instrument. In its preferred embodiment, the universal casing comprises a watertight instrument module which comprises (i) a facepiece having at least one aperture through which the read-out of the instrument can be observed, and (ii) an instrument housing extending rearwardly from the facepiece and mounted to the facepiece in a watertight fashion, the housing comprising a hollow body having an open front end mounted to the facepiece and a closed rear end; and a splash-resistant surface mount housing removably mounted to the facepiece, the surface mount housing having the hollow body of the instrument housing disposed therein. The casing of this invention is adaptable for mounting either flush, on a surface, or on a bracket.

Instruments which are suitable for marine use are those which provide information useful to the operator of a boat or ship. Such instruments typically include LORAN equipment for position locating, VHF radio for communicating with other ships or shore, depth gauge for navigation, windspeed gauge to facilitate ship handling, speed gauge for maintaining speed within legal limits and position locating, and musical reproduction or reception equipment for comfort and enjoyment. Although all of the above instruments are not required for safe operation of a boat or ship, without any of them, safe operation is significantly more difficult. The more instruments used, the more information is available to the operator of a ship or boat and the safer the operation. Each of the above-listed instruments has a read-out which provides the desired information and some, such as LORAN positioning equipment and VHF radio, also have dials or other controls for manipulating the instrument.

Unfortunately, each of these instruments has a different shape or configuration and requires different casings for mounting on a boat or ship. Accordingly, the cabin of a boat or ship having a plurality of these instruments, especially one having all of the above-listed instruments, can have an untidy or disorganized appearance.

BACKGROUND ART

Casings for marine instruments have been known, although these have been specific for certain instruments or types of instruments. For instance, Sarra, in U.S. Pat. No. 3,570,108, discloses a casing for instruments which is mounted flush on the dashboard of a boat. Similarly, Larson et al. discloses a flush instrument mounting casing for a marine instrument in U.S. Pat. No. 3,871,606. In another disclosure of an instrument mounting casing, Davidson discloses in U.S. Pat. No. 4,201,090 a waterproof bouyant instrument case and holder for marine instruments such as timers.

What is desired, therefore, is a casing for instruments which is universal (i.e., can be used to house a variety of instruments) and can be mounted in a variety of manners, such as surface mounting, flush mounting and bracket mounting.

DISCLOSURE OF INVENTION

The present invention relates to a universal casing for an instrument having a read-out suitable for flush, surface or bracket mounting, the casing comprising (a) a watertight instrument module which comprises a facepiece having at least one aperture through which the read-out of the instrument can be observed; and an instrument housing extending rearwardly from the facepiece and mounted to the facepiece in a watertight fashion, the housing comprising a hollow body having an open front end mounted to the facepiece and a closed rear end; and (b) a splash-resistant surface mount housing removably mounted to the facepiece, the surface mount housing having the hollow body of the instrument housing disposed therein.

BRIEF DESCRIPTION OF THE DRAWINGS

The present invention will be better understood and its advantages more apparent in view of the following detailed description, especially when read with reference to the appended drawings, wherein:

FIG. 5A is a front perspective view of the universal casing of the present invention mounted on a bracket with an instrument therein for mounting on a dashboard or stanchion; and FIG. 5B is a front perspective view of the universal casing of the present invention mounted on a bracket with an instrument therein for mounting on a dashboard or stanchion at a different angle;

FIG. 5C is a front perspective view of the universal casing of the present invention mounted on a bracket with an instrument therein for overhead mounting; and FIG. 5D is a front perspective view of the universal casing of the present invention mounted on a bracket with an instrument therein for mounting on a wall.

BEST MODE FOR CARRYING OUT THE INVENTION

Figure 1:
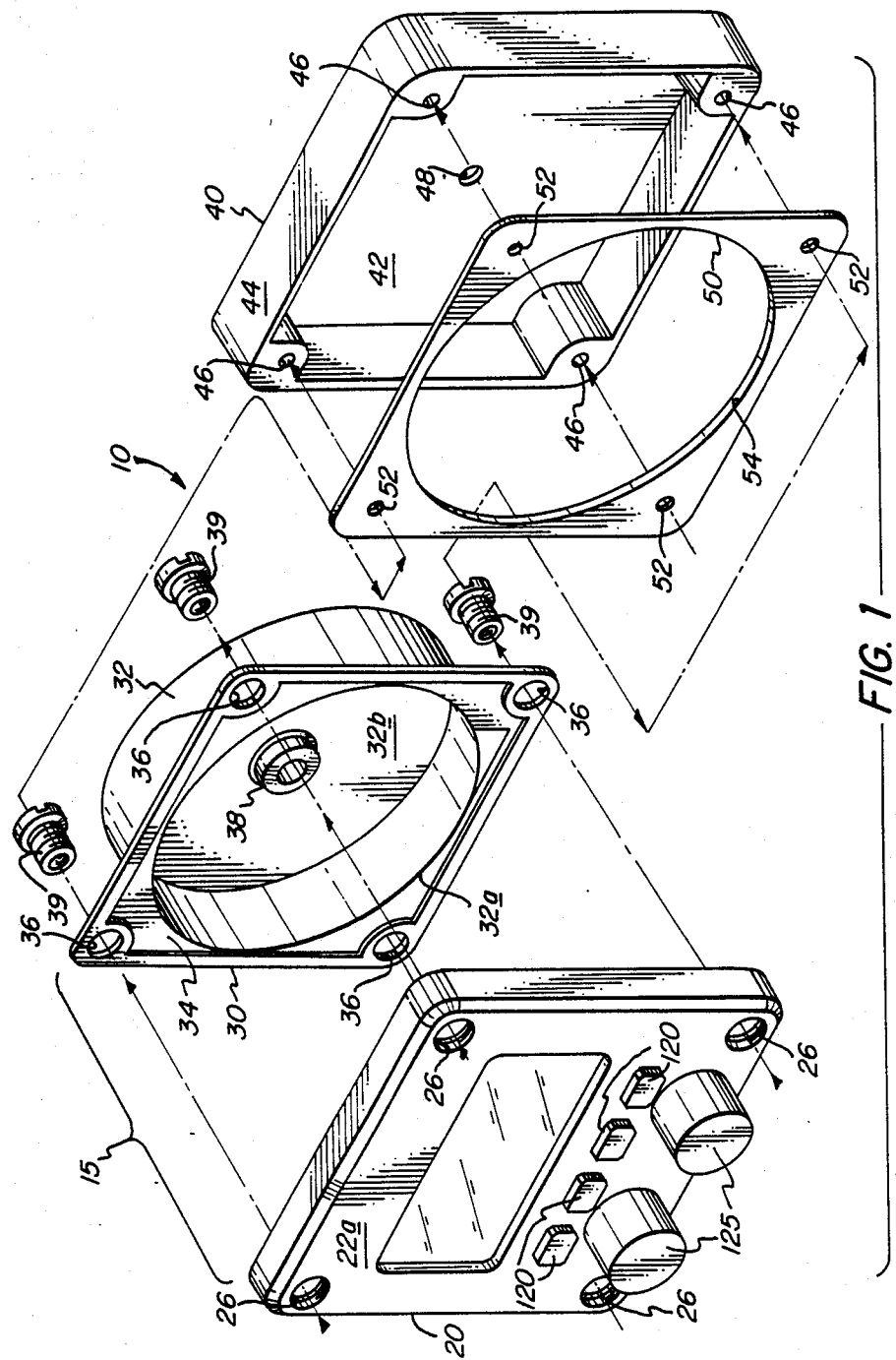
FIG. 1 is an exploded view of the watertight instrument module and splash-resistant surface mount housing of the universal casing of the present invention.

Referring to the drawings, a universal casing for an instrument, especially a marine instrument, in accordance with the invention, is generally indicated by the reference numeral 10. It should be noted that for the sake of clarity all the components and parts of universal casing 10 are not shown and/or marked in all the drawings. As used in this description, the terms "front", "rear", "up", "down", "top", "bottom", etc. refer to casing 10 when in the orientation illustrated in FIG. 1, although it will be understood that casing 10 may be in any of various orientations when in use, the orientation illustrated in FIG. 1 not being necessary for operability. As used herein, the term "watertight" refers to a seal which is capable of preventing water from passing the seal for extended periods of time when immersed; the term "water resistant" refers to a material which is capable of preventing water from passing therethrough when immersed for extended periods of time; and the term "splash-resistant" refers to a seal which is capable of preventing water from passing the seal when splashed thereon.

Although this disclosure is written in terms of a marine instrument casing and of mounting in a boat or ship, it will be understood that the present invention is equally applicable to other types of instruments for mounting in other environments, such as automotive instruments for mounting in a automobile dashboard.

As illustrated with reference to FIG. 1, casing 10 comprises a watertight instrument module 15 and a splash resistant surface mount housing 40. Watertight instrument module 15 generally comprises a facepiece 20 and an instrument housing 30. Also illustrated in FIG. 1 is a surface mount gasket 50 which may also be utilized as a component of casing 10.

Figure 2A:
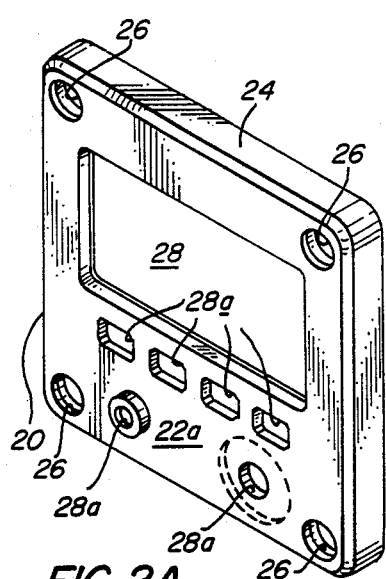
FIG. 2A is a front perspective view of one embodiment of the facepiece of the universal casing of the present invention.
Figure 2B:
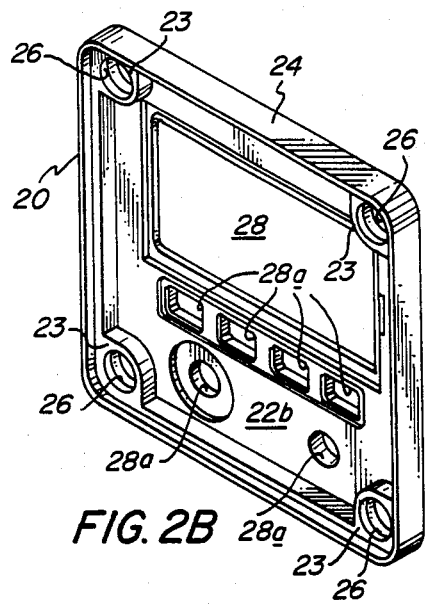
FIG. 2B is a rear perspective view of the facepiece of the universal casing of the present invention.

As illustrated in FIGS. 2A and 2B, facepiece 20 generally comprises an essentially flat element 22, having a front 22a and a rear 22b, which can be shaped as desired and usually assumes a rectangular shape, having a circumferential rim 24 extending rearwardly therefrom. Element 22 further comprises means for securing facepiece 20 to instrument housing 30. For instance, facepiece 20 can comprise facepiece screw-holes 26 disposed about the corners of flat element 22 and extending through flat element 22 to facilitate the screwing together of facepiece 20 and instrument housing 30, such as by means of screws or, preferably, screw plugs having through-holes, for example, to form watertight instrument module 15. Moreover, facepiece screw-holes 26 can facilitate surface mounting or flush mounting of casing 10 of the present invention, as will be discussed in more detail below. Advantageously, the rear 22b of flat element 22 has raised portions 23 at the corners thereof through which facepiece screw-holes 26 run, in order to provide structural stability to facepiece 20 against the forces which can be exerted upon it when screwed together with instrument housing 30 or mounted, it is preferred that circumferential rim 24 extends rearwardly from flat element 22 further than raised portions 23 to permit formation of a watertight seal between facepiece 20 and instrument housing 30, as will be discussed in more detail below.

Figure 3:
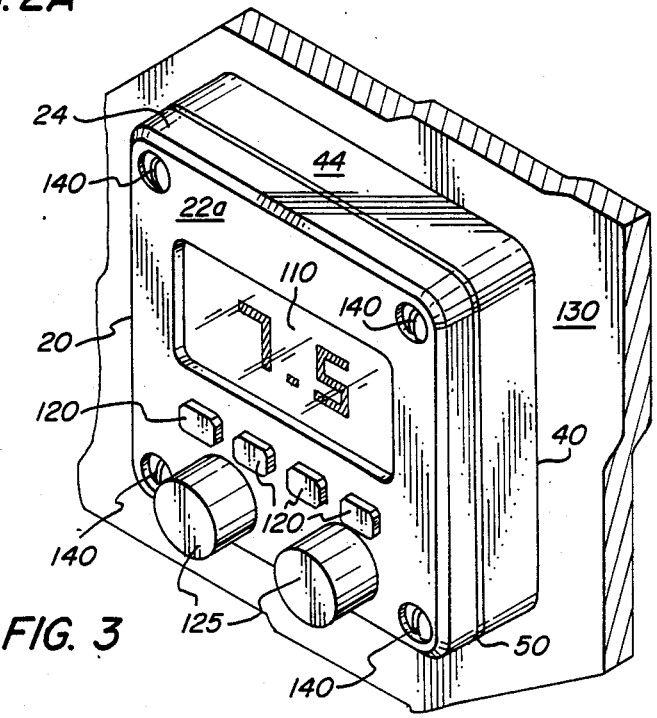
FIG. 3 is a front perspective view of the universal casing of the present invention surface mounted with an instrument therein.
Figure 4:
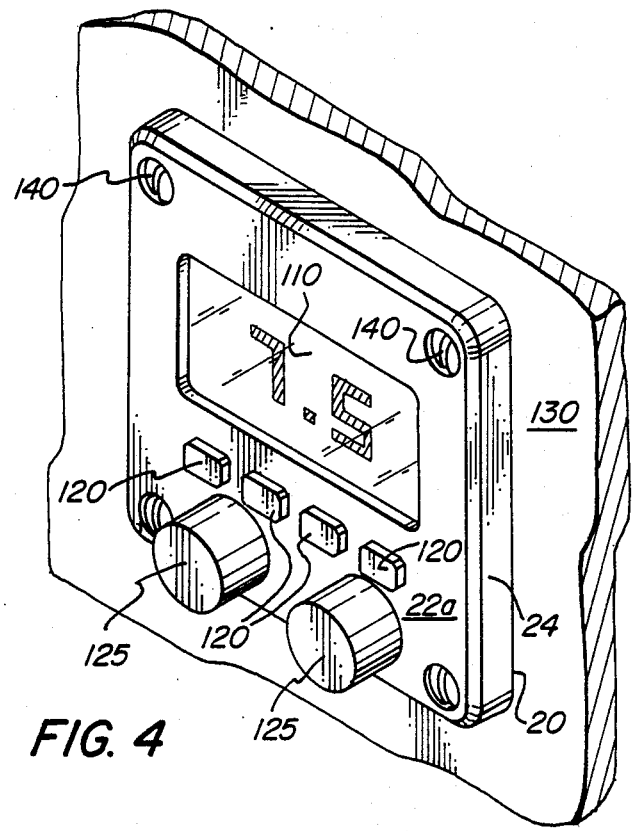
FIG. 4 is a front perspective view of the universal casing of the present invention flush mounted with an instrument therein.

Flat element 22 further comprises at least one aperture 28 through which the read-out 110 of an instrument disposed in casing 10 can be observed, as illustrated in FIGS. 2A and 2B. An exemplary instrument read-out through aperture 28 is illustrated in FIGS. 3 and 4. Aperture 28 can, if desired, have glass or other transparent material extending across it to protect the instrument disposed in casing 10, or, if the instrument itself has transparent material protecting its read-out, this can comprise the transparent material extending across aperture 28.

Advantageously, flat element 22, as seen in FIGS. 2A and 2B, may also comprise minor apertures 28a, which permit controls for the instrument disposed in casing 10 to be manipulated while the instrument is disposed in casing 10. Minor apertures 28a can be shaped to permit any of a variety of controls to extend through flat element 22, such as buttons 120 and dials 125, as illustrated in FIG. 1

Preferably, the material from which facepiece 22 is formed is a dimensionally stable, water resistant material. Most preferably, the dimensionally stable water resistant material out of which facepiece 22 is formed is a plastic material, especially a high impact plastic material, such as a polycarbonate polymer.

Instrument housing 30, as illustrated in FIG. 1, generally comprises a hollow body 32 having an open front end 32a and a closed rear end 32b, in which the instrument to be used with casing 10 is disposed. Advantageously, but not necessarily, instrument housing 30 is generally tubular in shape. In order to facilitate mounting of instrument housing 30 on facepiece 20, instrument housing 30 most preferably comprises a flange 34 provided on open front end 32a. Flange 34 is advantageously shaped in a complementary fashion to flat element 22 to permit formation of a watertight seal between instrument housing 30 and facepiece 20. For instance, if flat element 22 is rectangular, flange 34 should also be rectangular. In this way, when instrument housing 30 is mounted on facepiece 20, flange 34 sits against at least the outer circumference of the rear 22b of flat element 22 within circumferential rim 24.

Flange 34 preferably also comprises means to permit watertight attachment of instrument housing 30 (through the agency of flange 34) to facepiece 20. Suitable means most preferably include flange screw-holes 36 which extend through flange 34. The size of flange 34 should be that which permits flange 34 to fit inside of circumferential rim 24 of facepiece 20 in a close fitting relationship with flange screw-holes 36 lined up with facepiece screw-holes 26 to permit watertight attachment of instrument housing 30 to facepiece 20. The most preferred means of watertight attachment, as noted above, is by means of screw plugs 39 having through-holes. In the event housing 30 is rectangular in shape, additional screws may be required from the rear, as screw plugs 39, with allowances for appropriate apertures and bosses in facepiece 20 and instrument housing 30.

Rear end 32b of hollow body 32 of instrument housing 30 preferably also has at least one instrument housing port 38 for access of the instrument disposed within instrument housing 30 to external data such as depth sensors, antennae, etc., or to provide data to external objects, via wires, cable or other suitable means (not shown).

Preferably, flange 34 is formed on instrument housing 30, most preferably by integrally molding instrument housing 30 with flange 34 thereon. Advantageously, the material from which instrument housing 30 and flange 34 are formed is a dimensionally stable, water resistant material. Most preferably, the dimensionally stable water resistant material out of which they are formed is a plastic material, especially a high impact plastic material, such as a polycarbonate polymer.

As illustrated in FIG. 1, universal casing 10 further comprises a splash-resistant surface mount housing 40, removably mounted to facepiece 20. Surface mount housing 40 generally comprises a rear wall 42 and a side wall 44 which extends circumferentially about rear wall 42. Preferably, surface mount housing 40 should be shaped to be mounted on facepiece 20, most preferably with instrument housing 30 disposed therebetween, in a splash-resistant manner, as illustrated in FIG. 1. Side wall 44 should extend from rear wall 42 a sufficient distance to permit hollow body 32 of instrument housing 30 to be disposed within surface mount housing 40 when surface mount housing 40 is mounted on facepiece 20.

Surface mount housing 40 further comprises means for being mounted on facepiece 20, especially means which permit instrument housing 30 to be disposed therebetween. Suitable means include surface mount screw holes 46, as illustrated in FIG. 1. Advantageously, surface mount screw holes 46 extend completely through surface mount housing 40 to permit surface mount housing 40 (and thereby universal casing 10) to be mounted on the desired surface through screws (not shown) extending through facepiece screw holes 26, through-holes in screw plugs 39, flange screw holes 36 and surface mount screw holes 46.

Rear end 42 of surface mount housing 40 preferably also has at least one surface mount port 48 for access of means noted above for providing data to or from the instrument disposed within instrument housing 30 through instrument housing port 38 to the instrument.

Advantageously, the material from which surface mount housing 40 is formed is a dimensionally stable, water resistant material. Most preferably, the dimensionally stable water resistant material out of which surface mount housing 40 is formed is a plastic material, especially a high impact plastic material, such as a polycarbonate polymer.

When any or all of facepiece 20, instrument housing 30 and surface mount housing 40 are formed of a plastic material, as is preferred, they are advantageously formed by molding each respectively as a single integral unit, in the interest of efficiency, convenience and economy.

Optionally, universal casing 10 can also comprise a casing gasket 50, as illustrated in FIG. 1. Casing gasket 50, which can be formed of rubber, cork, or other commonly used gasket material, can be disposed between surface mount housing 40 and flange 34 when surface mount housing 40 is mounted on facepiece 20. In this way, casing gasket 50 causes the seal between surface mount housing 40 and flange 34 to be as splash resistant as possible.

Advantageously, casing gasket 50 comprises gasket screw holes 52 disposed thereabout corresponding in position to surface mount screw holes 46, flange screw holes 36, facepiece screw holes 26 and the through-holes in screw plugs 39 to permit a screw to be disposed therethrough. Of course, since hollow body 32 is intended to be disposed within surface mount housing 40 when surface mount housing is disposed on facepiece 20, casing gasket 50 should have an opening 54 therein to permit hollow body 32 to extend therethrough. Opening 54, to create as tight a seal as possible, should preferably conform in shape to hollow body 32 to fit snugly around hollow body 32. Therefore, if hollow body 32 is tubular in shape as is preferred, opening 54 should be circular as illustrated in FIG. 1 and have a diameter equal to or just slightly larger than the outer diameter of hollow body 32.

As noted, universal casing 10 can be used for a wide variety of instruments, including LORAN positioning equipment, VHF radio, equipment for musical sound reproduction or reception, depth gauge, windspeed gauge and speed gauge, which would otherwise require casings of vastly different sizes and shapes. The universal nature of universal casing 10 permits the boat manufacturer or designer significantly more freedom in arranging the dashboard more conveniently, ergonomically and/or aesthetically, in contrast to the limited way in which a dashboard could be arranged using the vastly different casings previously employed, especially when several instruments are desired.

In use, the components of the instrument are disposed within hollow body 32 of instrument housing 30. Instrument housing 30 is then mounted on facepiece 20 to form instrument module 15 by providing screw plugs 39, screws or other like means through facepiece screw holes 26 and flange screw holes 36. When mounted in this fashion, a watertight seal is provided between instrument housing 30 and facepiece 20, thereby causing instrument module 15 to be watertight. Care must be taken when disposing the instrument in instrument housing 30 and when mounting instrument housing 30 on facepiece 20 that the read-out 110 from the instrument is disposed so that it can be observed through aperture 28, as illustrated in FIGS. 3 and 4. Moreover, as illustrated in FIGS. 1, 3, 4 and 5A through 5D, if the instrument has buttons 120, dials 125 or other controls which must be manipulated, care must be taken that such buttons 120, dials 125 or other controls extend through minor apertures 28a to permit manipulation thereof. Any cables, wires or other means (not shown) for providing data to or from the instrument extend through port 38.

Universal casing 10 can, as illustrated in FIG. 4, be flush mounted in a boat dashboard 130 (shown in section, cut away) in this arrangement, if desired. To do so, a hole is cut in dashboard 130, of a size and shape to conform to the size and shape of hollow body 32 (if hollow body 32 is tubular in shape, as preferred, this process is facilitated since only a hole saw is required) and hollow body 32 placed into dashboard 130 through the hole. The screws 140 used to mount instrument housing 30 to facepiece 20 can then be used to securely mount universal casing 10 by screwing through dashboard 130. In this way, flush mounting of universal casing 10 can be accomplished without the need for access to the back of the unit, and without special bezels, elaborate cutouts or special bracketry installed from the rear of the panel to secure the unit, as is conventionally required When surface or bracket mounting is desired, surface mount housing 40 is disposed on watertight instrument module 15. Mounting instrument housing 30 to facepiece 20 by use of screw plugs 39 having through-holes provides a means for extending screws 140 through holes 26 in facepiece 20, holes 36 in instrument housing 30, through-holes in screw plugs 39 and holes 46 in surface mount housing 40 to create the surface mount version of universal housing 10. If used, casing gasket 50 is disposed between surface mount housing 40 and flange 34 and the screws 140 extended through gasket screw holes 52 before extended through surface mount screw holes 46. Any wires, cable or other means for providing data to or from the instrument can be extended through surface mount port 48.

To surface mount universal casing 10, as illustrated in FIG. 3, the screws 140 extend through facepiece screw holes 26, flange screw holes 36, through-holes in screw plugs 39, gasket screw holes 52 (if used) and surface mount screw holes 46 into dashboard 130 to surface mount universal casing 10. In this way, the only hole which has to be drilled through dashboard 130 is the hole to accomodate the means for providing data to or from the instrument.

To mount universal casing 10 on a bracket 150, the screws 140 extend through facepiece screw holes 26, flange screw holes 36, through-holes in screw plugs 39, gasket screw holes 52 (if used) and surface mount screw holes 46 into bracket body 152 of bracket 150, which in turn is mounted on dashboard 130 through bracket U-bar 154, such as with screws through screw holes 155, as illustrated in FIGS. 5A through 5D. Again, the only hole which must be drilled through dashboard 130 is that needed to accomodate the means for providing data to or from the instrument.

Bracket 150 can be used to mount universal casing on a dashboard 130 or stanchion 160, in an overhead manner on a ceiling 170, etc. or on a wall 180, depending on the orientation of bracket 150. For instance, if bracket U-bar 154 is oriented downwardly or in a general downward orientation, as illustrated in FIGS. 5A and 5B, universal casing 10 can be mounted on a dashboard 130 or stanchion 160. Similarly, if bracket U-bar 154 is oriented upwardly, as illustrated in FIG. 5C, universal casing 10 can be mounted in an overhead fashion. If bracket U-bar 154 is oriented at or near a generally ninety degree angle to bracket body 152, as illustrated in FIG. 5D, universal casing 10 can be mounted on a wall 180. Additionally, the angle which bracket U-bar 154 makes with bracket body 152 can be adjusted so as to position universal casing 10 as desired.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

What is claimed is:

1. A universal casing for an instrument having a read-out and adapted to be suitable for any selected one of flush, surface or bracket mounting, said casing comprising:
   a. a watertight instrument module which comprises:
      (i) a facepiece having at least one aperture through which the read-out of the instrument can be observed; and
      (ii) an instrument housing extending rearwardly from said facepiece, said housing comprising a hollow body having an open front end mounted to said facepiece and a closed rear end wherein said instrument housing further comprises a flange formed on the open front end of said instrument housing, said instrument housing being mounted on said facepiece through the agency of said flange; and
   b. a splash-resistant surface mount housing removably mounted to said facepiece such that said flange is disposed between said facepiece and said surface mount housing, said surface mount housing having the hollow body of said instrument housing disposed therein.

2. The casing of claim 1 which further comprises a surface mount gasket disposed between said surface mount housing and said facepiece to ensure the splash-resistant characteristics of said surface mount housing.

3. The casing of claim 1 wherein said surface mount housing comprises an opening for securing said surface mount housing to a surface on which said casing is to be mounted.

4. The casing of claim 1 wherein the hollow body of said instrument housing is generally tubular in shape with said front and rear ends comprised of the front and rear ends of the tube.

5. The casing of claim 1 which further comprises an instrument disposed within said instrument module.

6. The casing of claim 5 wherein said instrument is selected from the group consisting of LORAN positioning equipment, VHF radio, equipment for musical sound reproduction or reception, depth gauge, windspeed gauge and speed gauge.

7. The casing of claim 1 wherein said facepiece is formed of a dimensionally stable, water resistant plastic material.

8. The casing of claim 1 wherein said instrument housing is formed of a dimensionally stable, water resistant plastic material.

9. The casing of claim 1 wherein said surface mount housing is formed of a dimensionally stable, water resistant plastic material.

10. A universal casing for an instrument having a read-out and adapted to be suitable for any selected one of flush, surface or bracket mounting, said casing comprising:
    a. a watertight instrument module which comprises:
       (i) a facepiece having at least one aperture through which the read-out of the instrument can be observed; and
       (ii) an instrument housing extending rearwardly from said facepiece, said housing comprising a hollow body generally tubular in shape having an open front end mounted to said facepiece and a closed rear end and a flange formed on the open front end, said instrument housing being mounted on said facepiece through the agency of said flange;
    b. a splash-resistant surface mount housing removably mounted to said facepiece such that said flange is disposed between said facepiece and said surface mount housing, said surface mount housing having the hollow body of said instrument housing disposed therein; and
    c. a surface mount gasket disposed between said surface mount housing and said facepiece to ensure the splash-resistant characteristics of said surface mount housing.

11. The casing of claim 10 wherein said surface mount housing comprises an opening for securing said surface mount housing to a surface on which said casing is to be mounted.

12. The casing of claim 11 which further comprises an instrument disposed within said instrument module.

13. The casing of claim 12 wherein said instrument is selected from the group consisting of LORAN positioning equipment, VHF radio, equipment for musical sound reproduction or reception, depth gauge, windspeed gauge and speed gauge.

14. The casing of claim 10 wherein said facepiece is formed of a dimensionally stable, water resistant plastic material.

15. The casing of claim 10 wherein said instrument housing is formed of a dimensionally stable, water resistant plastic material.

16. The casing of claim 10 wherein said surface mount housing is formed of a dimensionally stable, water resistant plastic material.

* * * * *